UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

FIRE-EXTINGUISHING SOLUTION HAVING A LOW FREEZING-POINT.

1,292,743.

Specification of Letters Patent. Patented Jan. 28, 1919.

No Drawing. Application filed October 20, 1914. Serial No. 867,580.

*To all whom it may concern:*

Be it known that I, GEORGE E. FERGUSON, a citizen of the United States, and resident of the city, county, and State of New York, have invented certain new and useful Improvements in Fire-Extinguishing Solutions Having a Low Freezing-Point, of which the following is a specification.

The object of this invention is to produce a compound having a low freezing point, or more specifically, to lower the normal freezing point of the basic element of the compound. Carbon tetra chlorid has been selected as illustrative of a basic element which, being a solvent for other compounds, is useful for many purposes, among which fire extinguishing compounds may be mentioned, carbon tetra chlorid being non-inflammable.

The extensive uses to which carbon tetra chlorid is put, make it desirable to lower its normal freezing point (which in the chemically pure state is $-19.5°$ C.) to permit its use in temperatures where extreme cold weather prevails; that it may be utilized as a liquid and at the same time maintain all of its useful properties.

With this in mind, I have performed a large number of experiments to ascertain if some underlying principle can be made to govern this depression of the freezing point.

It is a well known fact that, considering inorganic compounds and the inorganic solvents, that the depression of the freezing point depends upon the solubility of the salts used and the degree of dissociation which takes place when these salts are dissolved in the solvent (which solvent in most cases, is water).

The laws governing the depression of the freezing point for "electrolytes" are simple:

1. The freezing point of a solution is lower than that of the pure solvent.

2. The depression of the freezing point is proportional to the concentration of the solution.

3. If "$t$" degrees be the depression produced by the presence of "$p$" grams of substance in 100 grams of the solvent, then the molecular depression $$C = \frac{t}{p} m$$

(where "$m$" is the molecular weight of the dissolved substance).

These laws do not hold good in the depression of the freezing point of carbon tetra chlorid. A good example of this is in the solution of a compound like azo benzene ($C_6H_5N_2C_6H_5$) which is very soluble in carbon tetra chlorid. When this substance is added the result is a higher freezing point than that of the carbon tetra chlorid alone, and the more azo compound dissolved the higher the freezing point.

When a number of such experiments were tried and no principle could be established, it was decided to try out all the "commercially possible" substances which could be dissolved in carbon tetra chlorid, to ascertain which would depress the freezing point. It was found that among the great variety of compounds tried out about 150 accomplished the desired result.

It is understood that some of these compounds would prove detrimental to the use of carbon tetra chlorid under certain conditions while they might prove very acceptable under others.

To simplify the list, it was thought best to classify these substances under different chemical groups, such as, (1) esters and ethers; (2) amins and amino compounds; (3) aldehydes and ketones; (4) alcohols; (5) oils; (6) hydrocarbons, substitutes and derivatives; (7) phenols and phenol derivatives; (8) terpenes, camphors and (9) acids, etc.

About the only generality which can be made in regard to all this investigation is the fact that most compounds which are in the liquid state at normal (room) temperature and which are soluble in carbon tetra chlorid lower the freezing point of the carbon tetra chlorid, and vice versa, most of the compounds which are solid at normal temperature and soluble in carbon tetra chlorid do not lower the freezing point but in most cases raise it. There are, however, enough exceptions to this generality to render it impossible of general application as a rule.

In this investigation no attempt was made to determine the quantity of substance dissolved in a known amount of solvent to produce an observed depression of the freezing point. It was thought that sufficient knowledge was gained in determining just what substances would accomplish the desired depressing effect on the freezing point.

Considering the group of amins and amino compounds, which are closely related, the following may be taken as a definition:

Amins and amino compounds are the names given to derivatives of ammonia in which one or more atoms of hydrogen are replaced by alkyl groups. They are also called substituted, or compound ammonias, and from their resemblance to ammonia and the caustic alkalis generally, constitute one of the groups of organic bases.

The following are examples of this group:

Anilin, $C_6H_5NH_2$; benzidin, $NH_2C_6H_4C_6H_4NH_2$; dimethyl amin $(CH_3)_2NH$; diphenyl amin, $(C_6H_5)_2NH$; dimethyl anilin, $C_6H_5N(CH_3)_2$; ethyl anilin, $C_6H_5NHC_2H_5$; methyl anilin, $C_6H_5NHCH_3$; pyridin, $CH(CHCH)_2N$; phenyl hydrazin $C_6H_5HNNH_2$; picolin, $CH_3C_5H_4N$; quinolin $C_9H_7N$; toluidin (ortho) $CH_3C_6H_4NH_2$.

It is obvious that it is impossible to cover every compound, in the manner described, to ascertain if the freezing point of carbon tetra chlorid could be lowered by dissolving the compound therein. I have, however, made tests in each class of compounds with commercially possible examples in each class. What future development may be made toward the reduction of the cost of a number of the expensive compounds, thus rendering the same "commercially possible" is problematical but my experiments and tests show that it is possible to generalize in these different divisions.

Four hundred and thirty experiments were performed, the substances selected being taken from the chemical catalogues. All of the organic substances costing one dollar or less per ounce were tried—as it was considered that these compounds, from the standpoint of cost, would be commercially possible. It was found that a great many of these compounds were insoluble in carbon tetra chlorid and therefore eliminated themselves from the investigation.

In addition to the general result sought, namely, the lowering of the freezing point of the solution, the particular use to which it is to be put will necessitate a consideration of the properties of the compounds used. For instance, carbon tetra chlorid is useful in fire extinguishing compositions and if a solution is made with an amino compound, such as anilin, to have a lower freezing point than that of the solvent and also be operative as a fire extinguisher consideration must be given to the fact that anilin is inflammable and, by itself, burns readily. Applicant has found, however, that a solution of carbon tetra chlorid and anilin can be formed which is non-inflammable and meets all of the conditions required, namely, a fire extinguishing solution having a low freezing point, lower than the normal freezing point of the solvent.

What I claim is:

1. A fire extinguishing solution having a low freezing point comprising a fire extinguishing solvent, and an organic compound containing an amino nucleus in its molecule dissolved therein.

2. A fire extinguishing solution having a low freezing point comprising a fire extinguishing solvent, and an amino compound dissolved therein.

3. A fire extinguishing solution having a low freezing point comprising a fire extinguishing solvent, and an amin dissolved therein.

4. A fire extinguishing solution having a low freezing point comprising carbon tetra chlorid, and an organic compound containing an amino nucleus in its molecule dissolved therein.

5. A fire extinguishing solution having a low freezing point comprising carbon tetra chlorid, and an amino compound dissolved therein.

6. A fire extinguishing solution having a low freezing point comprising carbon tetra chlorid, and an amin dissolved therein.

7. A fire extinguishing solution having a low freezing point comprising carbon tetra chlorid, and anilin dissolved therein.

Signed at the city, county, and State of New York, this 8th day of October, 1914.

GEORGE E. FERGUSON.

Witnesses:
HAROLD W. CHAPMAN,
LEWIS J. DOOLITTLE.